(12) United States Patent
Geringer et al.

(10) Patent No.: US 9,495,466 B2
(45) Date of Patent: Nov. 15, 2016

(54) LIDAR MODEL WITH HYBRID-COLUMNAR FORMAT AND NO INDEXES FOR SPATIAL SEARCHES

(71) Applicant: Oracle International Corporation, Redwood Shores, CA (US)

(72) Inventors: Daniel Geringer, Germantown, MD (US); Siva Ravada, Nashua, NH (US); Richard J. Anderson, Nashua, NH (US); Ying Hu, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 79 days.

(21) Appl. No.: 14/092,503

(22) Filed: Nov. 27, 2013

(65) Prior Publication Data

US 2015/0149479 A1    May 28, 2015

(51) Int. Cl.
*G06F 17/30* (2006.01)

(52) U.S. Cl.
CPC ..... *G06F 17/3087* (2013.01); *G06F 17/30961* (2013.01)

(58) Field of Classification Search
CPC ............ G06F 17/30625; G06F 17/3087; G06F 17/30961
See application file for complete search history.

(56) References Cited

U.S. PATENT DOCUMENTS

| | | | |
|---|---|---|---|
| 5,265,246 A * | 11/1993 | Li | ................ G06F 17/30398 |
| 5,278,783 A | 1/1994 | Edmondson | |
| 5,404,510 A | 4/1995 | Smith et al. | |
| 5,574,835 A | 11/1996 | Duluk et al. | |
| 5,794,229 A | 8/1998 | French et al. | |
| 6,061,763 A | 5/2000 | Rubin et al. | |
| 6,216,125 B1 | 4/2001 | Johnson | |
| 6,334,123 B1 | 12/2001 | Ross et al. | |
| 6,959,300 B1 | 10/2005 | Caldwell et al. | |
| 7,031,994 B2 | 4/2006 | Lao et al. | |
| 7,219,108 B2 | 5/2007 | Kothuri et al. | |

(Continued)

FOREIGN PATENT DOCUMENTS

WO    WO 2012/032184 A1    3/2012

OTHER PUBLICATIONS

Dittrich et al., "Towards a One Size Fits All Database Architecture" Proceedings of the 5th Biennial Conference on Innovative Data Systems Research, dated Jan. 6, 2011, 4 pages.

(Continued)

*Primary Examiner* — Jorge A Casanova
(74) *Attorney, Agent, or Firm* — Hickman Palermo Becker Bingham LLP; Marcel K. Bingham

(57) ABSTRACT

A method and apparatus for querying a database table containing point spatial data and without indexes is provided. A request for point spatial data in the table includes a query window provided by the user and describing an area of interest in which the user desires the point spatial data contained therein. The query window is tiled to create interior tiles and boundary tiles. A first query is formed to determine the point spatial data contained in the interior tiles. A second query is formed to determine the point spatial data contained within the boundary tiles and also within the query window. The second query includes a function that tests to determine whether the point spatial data within a boundary tile also lies within the query window. The first and second queries are executed in part on an enhanced data storage device and the results joined and returned to the user in answer to the request.

20 Claims, 6 Drawing Sheets

(56) References Cited

U.S. PATENT DOCUMENTS

| | | | |
|---|---|---|---|
| 7,272,589 B1* | 9/2007 | Guay | G06F 17/30312 707/716 |
| 7,496,589 B1 | 2/2009 | Jain et al. | |
| 7,552,130 B2 | 6/2009 | Cook et al. | |
| 7,558,290 B1 | 7/2009 | Nucci et al. | |
| 7,580,927 B1 | 8/2009 | Abugov | |
| 7,720,878 B2 | 5/2010 | Caldwell et al. | |
| 8,392,382 B2 | 3/2013 | Marwah et al. | |
| 8,832,142 B2 | 9/2014 | Marwah et al. | |
| 2002/0075714 A1 | 6/2002 | Pereira et al. | |
| 2003/0212694 A1 | 11/2003 | Potapov et al. | |
| 2004/0078461 A1 | 4/2004 | Bendich et al. | |
| 2005/0192941 A1 | 9/2005 | Biedenstein | |
| 2005/0203932 A1 | 9/2005 | Kothuri et al. | |
| 2005/0210054 A1 | 9/2005 | Harris | |
| 2005/0222978 A1 | 10/2005 | Dory et al. | |
| 2006/0074941 A1 | 4/2006 | Flynn | |
| 2006/0074977 A1 | 4/2006 | Kothuri | |
| 2006/0190425 A1 | 8/2006 | Chang | |
| 2007/0109155 A1 | 5/2007 | Fallon | |
| 2007/0112736 A1 | 5/2007 | Okamoto et al. | |
| 2007/0143248 A1 | 6/2007 | Uppala | |
| 2008/0050025 A1 | 2/2008 | Bashyam et al. | |
| 2008/0071818 A1 | 3/2008 | Apanowicz et al. | |
| 2008/0162424 A1 | 7/2008 | Adler et al. | |
| 2008/0162523 A1 | 7/2008 | Kraus et al. | |
| 2008/0281784 A1 | 11/2008 | Zane et al. | |
| 2008/0294676 A1 | 11/2008 | Faerber et al. | |
| 2008/0294863 A1 | 11/2008 | Faerber et al. | |
| 2009/0019029 A1 | 1/2009 | Tommaney | |
| 2009/0094010 A1 | 4/2009 | Kothuri et al. | |
| 2009/0248648 A1 | 10/2009 | Johnson et al. | |
| 2010/0030796 A1 | 2/2010 | Netz et al. | |
| 2010/0278446 A1 | 11/2010 | Ganesh et al. | |
| 2010/0281004 A1 | 11/2010 | Kapoor et al. | |
| 2010/0281079 A1 | 11/2010 | Marwah et al. | |
| 2011/0016157 A1 | 1/2011 | Bear et al. | |
| 2011/0029569 A1 | 2/2011 | Ganesh et al. | |
| 2011/0137940 A1 | 6/2011 | Gradin et al. | |
| 2011/0219020 A1 | 9/2011 | Oks et al. | |
| 2012/0054195 A1 | 3/2012 | Hu et al. | |
| 2012/0054225 A1 | 3/2012 | Marwah et al. | |
| 2012/0143833 A1 | 6/2012 | Ganesh et al. | |
| 2012/0166446 A1 | 6/2012 | Bowman et al. | |
| 2012/0173515 A1 | 7/2012 | Jeong et al. | |
| 2013/0036101 A1 | 2/2013 | Marwah | |
| 2014/0244635 A1 | 8/2014 | Hu et al. | |
| 2014/0279959 A1 | 9/2014 | Marwah et al. | |
| 2014/0281247 A1 | 9/2014 | Loaiza et al. | |
| 2015/0032763 A1 | 1/2015 | Marwah et al. | |

OTHER PUBLICATIONS

Rabb, David, "How to Judge a Columnar Database", Information Management, website http://license.icopyright.net/user/viewFreeUse.act?fuid=MTMxMDAzMjU%3D, dated Dec. 14, 2007, 2 pages.

Macnicol Roger et al, "Sybase IQ Multiplex-Designed for Analytics", Proceedings of the 30$^{th}$ VLDB Conference, dated 2004, 4 pages.

Sybase IQ, "Administration Guide", Document ID: 35375-01-1121-02, dated Sep. 19, 1997, 426 pages.

Sybase IQ, "Gaining the Performance Edge Using a Column-Oriented Database Management System", 12 pages, dated Mar. 2009.

Sybase IQ, "An Advanced Columnar Data Warehouse Architecture", Winter Corporation, 17 pages, Dated Jun. 2010.

Winter Corporation, "Demonstrating Efficiency in Large-Scale Data Warehousing", A review of new TPC-H results for the Sun-Sybase IQ Platform, 20 pages, dated in 2003.

Macnicol, Roger et. al., "Sybase IQ Multiplex—Designed for Analytics", Proceeding VLDB 2004 Proceedings of the Thirteenth international conference on Very large data bases—vol. 30, 2004, VLDB Endowment, ISBN:0-12-088469-0, 4 pages.

Abadi, Daniel J. et. al., "Column-Stores vs. Row-Stores: How Different Are They Really?" ACM 2008, SIGMOD, Jun. 9-Jun. 12, 2008, 14 pages.

Ailamaki, Anastassia, et al, "Weaving Relations for Cache Performance," Proceedings of the 27$^{th}$ International Conference on Very Large Data Bases, Rome, Italy, Sep. 11-14, 2001, 14 pages.

Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).

W3Schools "SQL Update Statement", Wayback Machine darted Apr. 19, 2012, on the internet www.w3schools.com/sql/sql_update.asp>, 1 page.

\* cited by examiner

| X | Y | ELEVATION | INTENSITY | COLOR | TEXTURE |
|---|---|---|---|---|---|
| x1 | y1 | z1 | i1 | c1 | t1 |
| x2 | y2 | z2 | i2 | c2 | t2 |
| x3 | y3 | z3 | i3 | c3 | t3 |
| x4 | y4 | z4 | i4 | c4 | t4 |
| x5 | y5 | z5 | i5 | c5 | t5 |
| x6 | y6 | z6 | i6 | c6 | t6 |
| x7 | y7 | z7 | i7 | c7 | t7 | point_tab 102

LIDAR MODEL WITH HYBRID-COLUMNAR FORMAT AND NO INDEXES FOR SPATIAL SEARCHES

CROSS-REFERENCE TO RELATED APPLICATIONS

The present application incorporates by reference the entire contents of U.S. application Ser. No. 13/780,990, titled "Method For Query Processing Of Topological Relationships Among Complex Spatial Objects" and filed on Feb. 28, 2013.

The present application incorporates by reference the entire contents of U.S. application Ser. No. 12/871,824, titled "Query And Exadata Support For Hybrid Columnar Compressed Data", and filed on Aug. 30, 2010.

The present application incorporates by reference the entire contents of U.S. application Ser. No. 13/840,811, titled "Method To Accelerate Queries Using Dynamically Generated Alternate Data Formats In Flash Cache", and filed on Mar. 15, 2013.

The present application incorporates by reference the entire contents of U.S. application Ser. No. 13/797,063, titled "OLTP Compression Of Wide Tables", and filed on Mar. 12, 2013.

The present application incorporates by reference the entire contents of U.S. application Ser. No. 13/631,434, titled "Predicate Result Cache", and filed on Sep. 28, 2012, the contents of which are incorporated herein by reference.

FIELD OF THE INVENTION

The present invention relates generally to handling point spatial data in a database system and more particularly to storing and retrieving point spatial data in a database system without using spatial indexes.

BACKGROUND

Light Detection and Ranging or Laser Imaging Detection and Ranging (LIDAR) is an optical remote sensing technology that is used to gather information regarding targeted surfaces. The technology generates a large number of data points, in some cases billions of data points, over the targeted surface where the data points include information such as the range or distance from the laser to the target, orientation, scan angle, calibration data, and often other attributes relating to the surface such as intensity, color and texture. The data points are stored in a database and retrieved for processing to generate digital elevation models, canopy models, building models, and contours.

In the database, the data points can be stored in traditional database tables with the help of a spatial index. However, it is time consuming to load large volumes of data into a table with a spatial index because the overhead of maintaining the index is high.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 depicts a database table holding spatial data according to an embodiment of the present invention;

DETAILED DESCRIPTION

Figure 2:
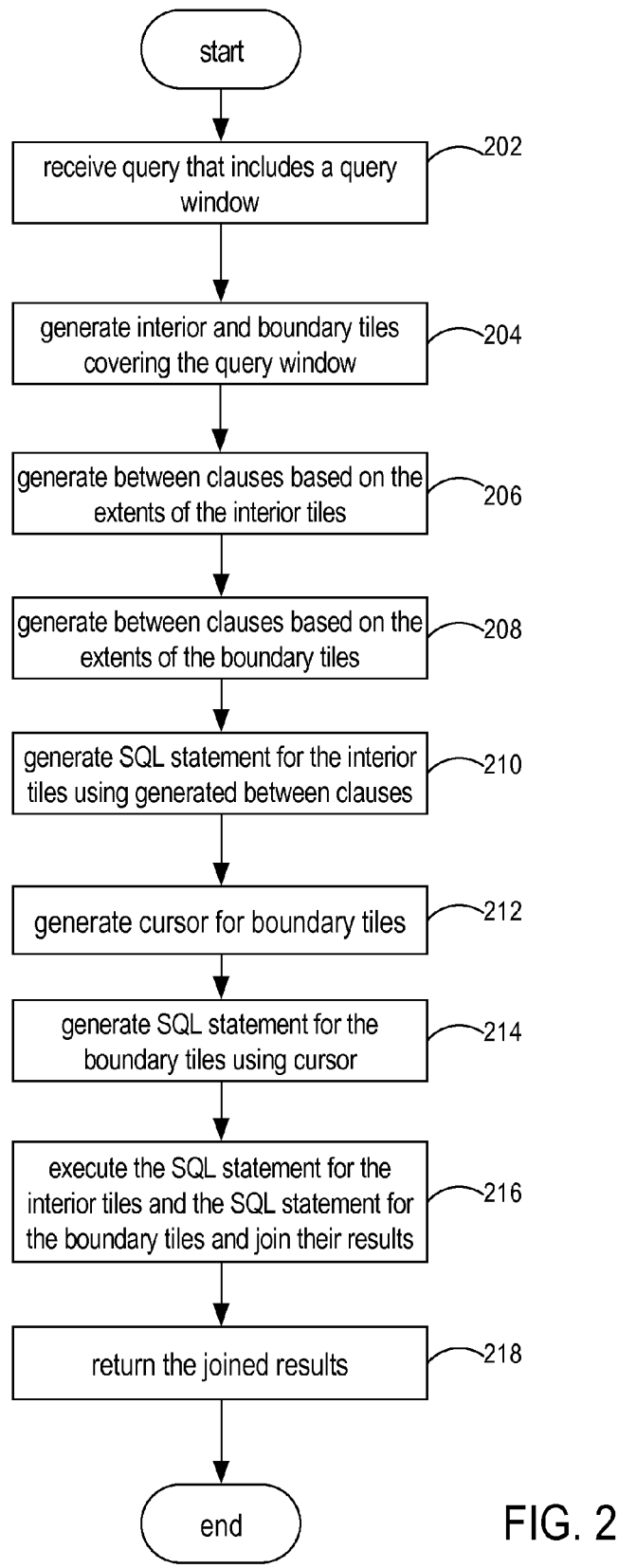
FIG. 2 depicts a flow chart for the overall operation according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques described herein provide for the efficient loading and storage of point data without having to create indexes for the point data. Loading data without creating indexes can be very fast because point data only needs to be entered into a table row; no additional processing is needed because no index needs to be updated. In addition, the point data is stored so that efficient access and query optimizations are realized in other ways that do not require indexing.

Specifically, the point data is stored by a DBMS in an enhanced storage device in either uncompressed form, or in compressed hybrid-columnar format, enabling efficient querying of the point data. The enhanced storage device is also capable of processing "smart scan requests" issued by a database server of a DBMS. A smart scan request specifies requested data blocks, the operation to be performed on the requested data blocks, and one or more filtering criteria. In response, the enhanced storage device retrieves the data blocks from persistent storage, filters rows in the data blocks, and returns data blocks containing only rows that satisfy the filtering criteria. Details of "smart scan requests" are found in U.S. application Ser. No. 13/840,811, titled "Method To Accelerate Queries Using Dynamically Generated Alternate Data Formats In Flash Cache", and filed on Mar. 15, 2013.

This smart scan capability enables a DBMS to off load portions of the work of computing a query to an enhanced storage device. Spatial queries are written into database statements that contain predicate clauses that can be computed efficiently through smart scan requests.

In addition, storing point data in hybrid-columnar format leverages the power and efficiency of storing and scanning columns stored in column-major format. In hybrid-columnar format, the rows are stored in data blocks and pivoted into column-major format. Hybrid-columnar format enables an enhanced storage device to perform fast columnar scanning of columns. Storing columns in column-major format also enhances compressibility and columnar scanning. Compressed columns can also be evaluated more quickly without decompressing column values in the compressed columns. Approaches for scanning compressed column-major data in hybrid-columnar format can be found in U.S. application Ser. No. 13/631,434, titled "Predicate Result Cache", and filed on Sep. 28, 2012.

Data Storage

Data relating to each point collected over the targeted surface is stored in a row of a table stored in hybrid-columnar format in enhanced storage device. Each column in the table is an attribute of the data point (x and y). FIG. 1 depicts an exemplary table point_tab 102. Point_tab 102 includes rows 104, 106, 108, 110, 112, 114, 116 and columns X, Y, ELEVATION, INTENSITY, COLOR, and TEXTURE. Each row describes a different point, which is identified by the point's x coordinates and y coordinates in column X and column Y, respectively. The elevation data for the point resides in ELEVATION while various attributes of the point are stored in columns INTENSITY, COLOR, and TEXTURE. Of course, the table can have additional columns for additional attributes relating to the points.

Preferably, none of columns of point_tab 102 should be indexed. Thus, when data is loaded or otherwise inserted as rows into point_tab 102, the loading is relatively much quicker because no indexes are updated during the loading. In another embodiment, indexes on any of columns of point_table 102 are created asynchronously or synchronously with the loading the data. The data can be loaded programmatically, or by building a SQL*Loader control file and populated in direct path mode.

The table resides in an enhanced storage device, either uncompressed, or in hybrid-columnar format. As such, within each data block data of data blocks in which rows for the table are stored, if compressed, one or more of columns of point_tab 102 is stored in column-major format in the data block and/or are compressed in the data block.

Flow Chart of Overall Operation

FIG. 2 depicts a flow chart for the overall operation. In step 202, a query window is defined from the query input. In step 204, a function generates a set of interior tiles and a set of boundary tiles that cover the query window.

In step 206, a set of "BETWEEN" clauses is generated based on the extents of the interior tiles. In step 208, a set of corresponding "BETWEEN" clauses is generated based on the extents of the boundary tiles. A DBMS offloads computation of such BETWEEN clauses by issuance of smart scan requests to an enhanced storage device.

In step 210, the SQL statement for the interior tiles is generated and when executed in a subsequent step (216), returns all data points from the table that are within the interior tiles. In step 212, a SQL statement is generated for the boundary tiles by calling a function, PointInPolygon, whose first parameter is the cursor created in step 212 and second parameter is the query window. The PointInPolygon function further evaluates every point returned by the cursor and only returns points that fall inside the perimeter of the query window. In step 216, the SQL statement for the interior tiles and the SQL statement for the boundary tiles are executed and their results are combined together. In step 218, the combined result is then returned to answer the query.

The Query Window

Figure 3:
FIG. 3 depicts an example query window according to an embodiment of the present invention.

FIG. 3 depicts an example query window 302, which covers some portions of the points in the database table. The query window represents an area of interest, such as a topological feature, about which the user seeks information contained in the data points that are included in the area.

The Interior And Boundary Tiles

Figure 4:
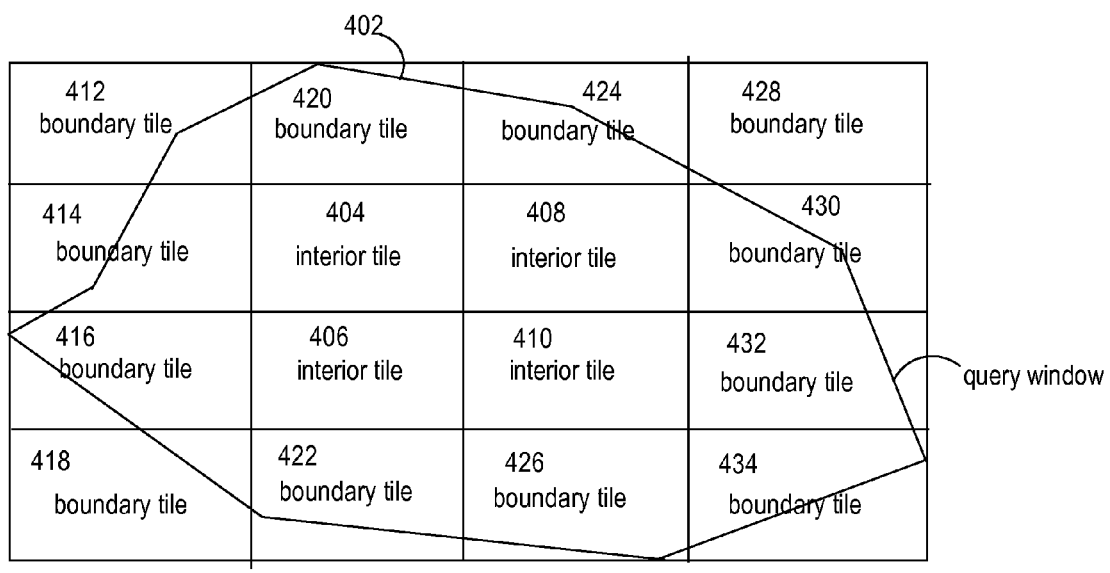
FIG. 4 depicts example interior and boundary tiles for the example query window according to an embodiment of the present invention.

FIG. 4 depicts example interior and boundary tiles that are generated in step 204 of FIG. 2 for the example query window 402. The tiles 404, 406, 408, 410 labeled "interior tile" are those completely within the query window. The tiles 412, 414, 416, 418, 420, 422, 424, 426, 428, 430, 432, 434 labeled "boundary tile" are those that contain a portion of the perimeter of the query window 402. According to embodiment, the tiles may be created by a regular nested tessellation algorithm using rectangles. The tessellation begins by placing a minimum bounding rectangle about the query window. In the first level of recursion, the minimum bounding rectangle is divided and those rectangles that are neither interior nor boundary rectangles are dropped. In the next level of recursion, the interior and boundary rectangles are again divided and those that are not interior or boundary rectangles are dropped. The recursion tests whether a specified total number of tiles is generated and a specified minimum level of recursion is reached. Specifically, if the given minimum level of recursion is reached and the total number of tiles is greater than the specified number, then the recursion ends. If the given minimum level of recursion is reached and the total number of tiles is less than the specified number, then each boundary tile is examined to determine if the tile can be replaced with a smaller tile or the tile can be replaced with less than four boundary tiles at the next level of division. This examination of boundary tiles continues until the specified number of tiles is exceeded, at which point the recursion ends. A tessellation algorithm with rectangles is described in Samet, The Design and Analysis of Spatial Data Structures (1990) and in van Oosterom, Reactive Data Structures For Geographic Information Systems (1993). An embodiment of the present invention is not limited to any particular technique for generating tiles.

The Extents

Figure 5:
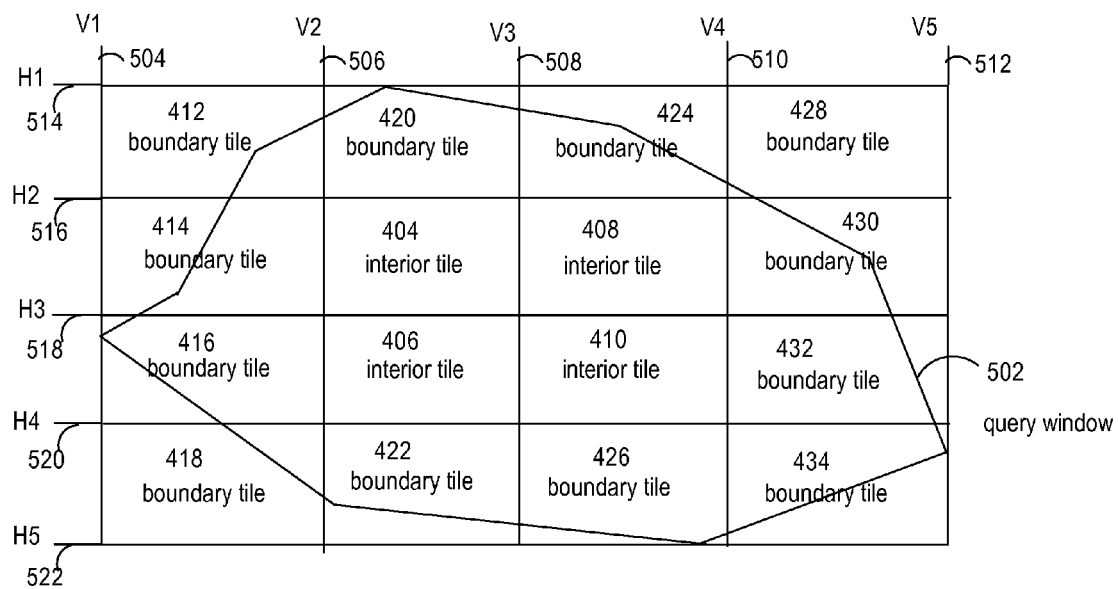
FIG. 5 depicts extents for the interior tiles and boundary tiles according to an embodiment of the present invention.

FIG. 5 depicts extents for the interior tiles and exterior tiles that are computed in step 206 of FIG. 2. In one embodiment, such as the one depicted in FIG. 5, the extent of a tile can be defined by two corners, the lower left and upper right. Given the matrix made up of horizontal lines H1, H2, H3, H4, H5 and vertical lines V1, V2, V3, V4, V5, the lower left corner of a tile is defined at the intersection of a vertical and horizontal line. The upper right corner of a tile is also defined at the intersection of a vertical and a horizontal line. For example, the extent of the upper left boundary tile 412 is the lower left corner at H2, V1 and the upper right corner at H1, V2. In another embodiment, the extent of each tile in one embodiment are the x and y-coordinates for the lower left corner and the x and y-coordinates of the upper right corner. Of course, any similar description of the tile is suitable.

The "BETWEEN" Clauses

Table 1 depicts the "BETWEEN" clauses generated for the extents of the tiles in FIG. 5. The extent data for each tile, either interior or boundary, is captured by a "BETWEEN" clause, so that the clause can determine any data points that fall within the tile. Computation of the BETWEEN clauses is accomplished through issuance of smart scan requests to an enhanced storage device storing the table. The "BETWEEN" clauses for the interior tiles depicted in FIG. 5 are contained in Table 1. The first value in a "BETWEEN" clause must be a smaller numeric value than the second value, otherwise no data points are found by the clause, i.e., the result is an empty set. For example, in the first "BETWEEN" clause in Table 1 below, V2 is numerically less than V3 and H3 is numerically less than H2.

TABLE 1

| Tile | Clause |
| --- | --- |
| 404 | BETWEEN V2 AND V3 AND BETWEEN H3 AND H2 |
| 406 | BETWEEN V2 AND V3 AND BETWEEN H4 AND H3 |

TABLE 1-continued

| Tile | Clause |
|------|--------|
| 408  | BETWEEN V3 AND V4 AND BETWEEN H3 AND H2 |
| 410  | BETWEEN V3 AND V4 AND BETWEEN H4 AND H3 |

The "BETWEEN" clauses for the boundary tiles depicted in FIG. 5 are contained in Table 2.

TABLE 2

| Tile | Clause |
|------|--------|
| 412  | BETWEEN V1 AND V2 AND BETWEEN H2 AND H1 |
| 414  | BETWEEN V1 AND V2 AND BETWEEN H3 AND H2 |
| 416  | BETWEEN V1 AND V2 AND BETWEEN H4 AND H3 |
| 418  | BETWEEN V1 AND V2 AND BETWEEN H5 AND H4 |
| 420  | BETWEEN V2 AND V3 AND BETWEEN H2 AND H1 |
| 422  | BETWEEN V2 AND V3 AND BETWEEN H5 AND H4 |
| 424  | BETWEEN V3 AND V4 AND BETWEEN H2 AND H1 |
| 426  | BETWEEN V3 AND V4 AND BETWEEN H5 AND H4 |
| 428  | BETWEEN V4 AND V5 AND BETWEEN H2 AND H1 |
| 430  | BETWEEN V4 AND V5 AND BETWEEN H3 AND H2 |
| 432  | BETWEEN V4 AND V5 AND BETWEEN H4 AND H3 |
| 434  | BETWEEN V4 AND V5 AND BETWEEN H5 AND H4 |

The SQL Statement For The Interior Tiles

The SQL statement generated in step 210 of FIG. 2 for the Interior Tiles of FIG. 5 is depicted in Table 3.

TABLE 3

```
SELECT *
FROM point_tab a
WHERE   (a.x BETWEEN V2 AND V3 AND a.y BETWEEN H3 AND H2)
   OR   (a.x BETWEEN V2 AND V3 AND a.y BETWEEN H4 AND H3)
   OR   (a.x BETWEEN V3 AND V4 AND a.y BETWEEN H3 AND H2)
   OR   (a.x BETWEEN V3 AND V4 AND a.y BETWEEN H4 AND H3);
```

The statement includes a SELECT clause with * to return all of the columns of the rows meeting the WHERE condition in the table specified in the FROM clause. The WHERE condition is an OR'ed list of BETWEEN clauses, where each clause specifies the extent of an interior tile of which there are four in FIG. 5.

The SQL Statement For The Boundary Tiles

Table 6 depicts the SQL statement generated in step 214 for the boundary tiles of which there are 12 in FIG. 5.

TABLE 6

```
SELECT *
FROM TABLE (sdo_PointInPolygon (
    CURSOR(SELECT *
        FROM point_tab a
            WHERE   (a.x BETWEEN V1 AND V2 AND a.y BETWEEN H2 AND H1)
                OR  (a.x BETWEEN V1 AND V2 AND a.y BETWEEN H3 AND H2)
                OR  (a.x BETWEEN V1 AND V2 AND a.y BETWEEN H4 AND H3)
                OR  (a.x BETWEEN V1 AND V2 AND a.y BETWEEN H5 AND H4)
                OR  (a.x BETWEEN V2 AND V3 AND a.y BETWEEN H2 AND H1)
                OR  (a.x BETWEEN V2 AND V3 AND a.y BETWEEN H5 AND H4)
                OR  (a.x BETWEEN V3 AND V4 AND a.y BETWEEN H2 AND H1)
                OR  (a.x BETWEEN V3 AND V4 AND a.y BETWEEN H5 AND H4)
                OR  (a.x BETWEEN V4 AND V5 AND a.y BETWEEN H2 AND H1)
                OR  (a.x BETWEEN V4 AND V5 AND a.y BETWEEN H3 AND H2)
                OR  (a.x BETWEEN V4 AND V5 AND a.y BETWEEN H4 AND H3)
                OR  (a.x BETWEEN V4 AND V5 AND a.y BETWEEN H5 AND H4)
    Query_window, Tolerance));
```

The SQL statement includes a table of the data points, a SELECT*clause, which selects all of the columns returned from the PointInPolygon function whose first argument is a CURSOR that selects all of the points that interact with boundary tiles and whose second argument is the query window. The PointInPolygon function further evaluates each point returned by the CURSOR and returns only those points that fall inside the perimeter of the query window.

One or more smart scan requests may be issued to an enhanced storage device for each of the BETWEEN clauses. Each such smart scan request specifies one or more filtering criteria based on the predicate conditions specified for column X (i.e. "a.x") and column Y (i.e. "y.x") in the respective BETWEEN clause. If the point data is compressed in hybrid-columnar format, the enhanced storage device performs columnar scanning for rows that satisfy the one or more filtering criteria. No index is used to identify rows that satisfy the one or more filtering criteria.

The CURSOR

The CURSOR is passed in as the first parameter to the PointInPolygon function. The CURSOR represents a SQL statement that returns points from the point table that fall within boundary tiles using BETWEEN clauses built from the extents of the boundary tiles. Thus, the CURSOR returns rows of the table that are within the boundary tiles, but not necessarily within the query window. A subsequent test determines whether the rows returned by the CURSOR are within the query window.

PointInPolygon Function

The pointInPolygon function takes as one input the CURSOR, which generates a set of rows that fall within the boundary tiles. The function takes in a query window as its other input and determines whether the rows generated by the CURSOR fall within the query window perimeter. Thus, the PointInPolygon function returns the rows that fall within the boundary tile and within the query perimeter.

To perform the query window perimeter check, the pointInPolygon function builds an in-memory R-tree index for the query window and uses the in-memory R-tree to process all of the cursor-generated rows against the R-tree. For more details regarding determining whether a point falls within a polygon, refer to U.S. application Ser. No. 13/780,990, titled "Method For Query Processing Of Topological Relationships Among Complex Spatial Objects" and filed on Feb. 28, 2013.

If the CURSOR includes additional predicates added to the WHERE clauses, this further reduces the number of points processed by the PointInPolygon function and thus overall query time.

Execution and Joining of SQL Statements

Once generated, the SQL statement for the interior tiles and the SQL statement for the boundary tiles are coupled with a UNION ALL and executed, as depicted in step 218 of FIG. 2. The UNION-ALL operation computes the union of two sets of rows without regard to duplicate rows. In one embodiment, the execution of the SQL statements proceeds in parallel with the UNION ALL occurring on the fly, which means joining the results produced from the SQL statements as they occur.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
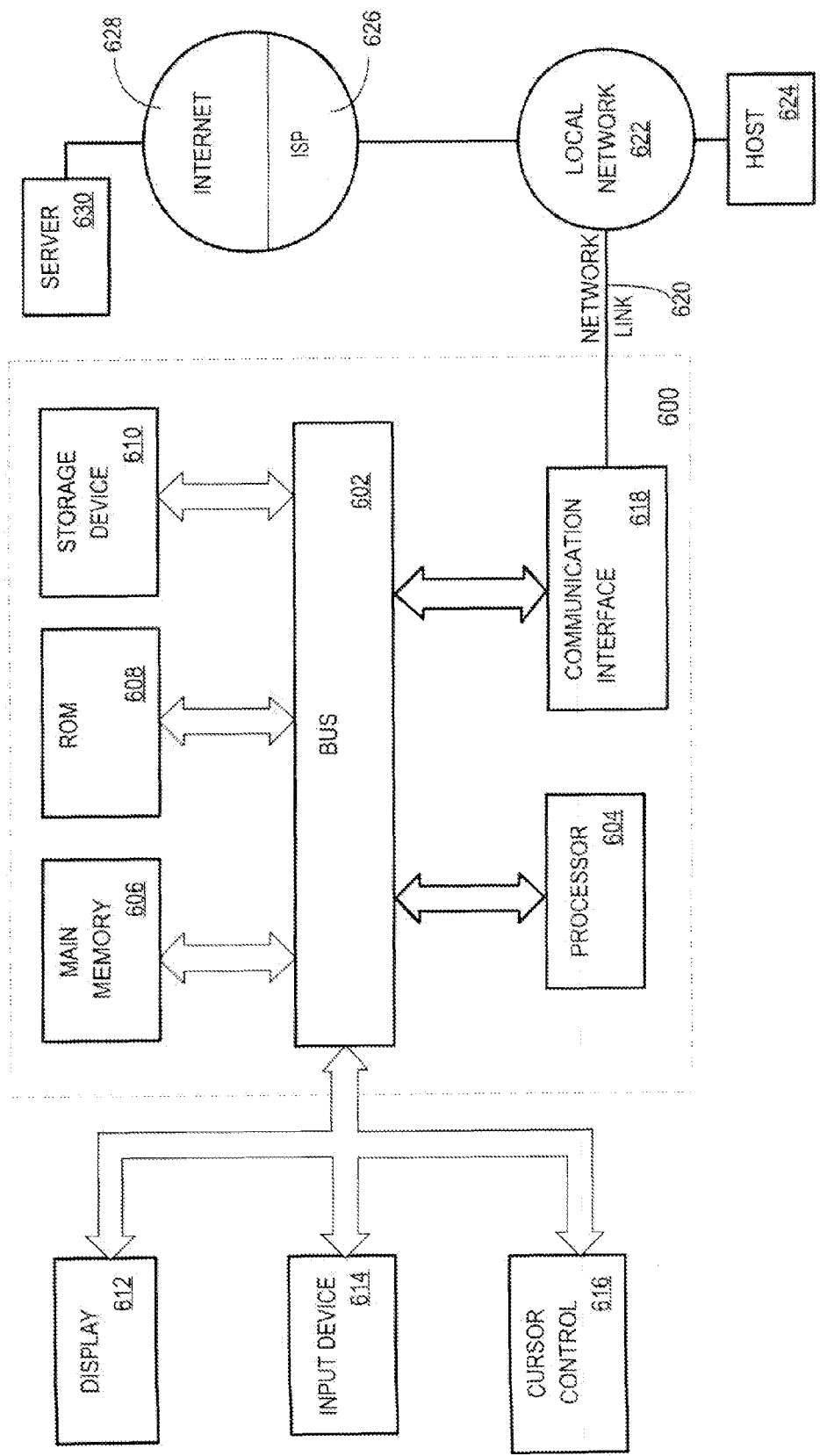
FIG. 6 depicts an example computer system with which the methods described can operate.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for querying a database having a table containing point spatial data, the method comprising:
   receiving a user request specifying a query window for point spatial data contained within the query window;
   generating one or more tiles that cover the query window;
   computing extents of the one or more tiles;
   generating a query for determining point spatial data in the table contained within the one or more tiles using the extents of the one or more tiles, said query comprising predicate clauses within a WHERE clause, said predicate clauses comprising, for each extent of said extents, a respective predicate clause specifying one or more conditions based on said each extent; and
   computing the query, wherein computing the query includes, for each predicate clause of said predicate clauses:
      sending a respective set of smart scan requests to an enhanced storage device for execution to cause said enhanced storage device to scan for rows that satisfy the one or more conditions of said each predicate clause, and
      from the enhanced storage device, receiving resultant rows returned for the respective set of smart scans.

2. The method of claim 1, wherein the table is stored in hybrid-columnar format.

3. The method of claim 2, wherein said table is not indexed by a DBMS.

4. The method of claim 2, wherein said one or more conditions of each predicate clause of said predicate clauses are based on columns of said table, wherein said columns of said table are not indexed by a DBMS.

5. The method of claim 1, wherein generating the one or more tiles includes tiling the query window.

6. The method of claim 1, wherein generating the query includes using the extents of the one or more tiles to generate SQL "BETWEEN" clauses for the query.

7. The method of claim 1, after computing the query, loading point spatial data into said table without updating an index on said table.

8. The method of claim 1, wherein in response to said sending a respective set of smart scan requests to an enhanced storage device, said enhanced storage device performs columnar scanning on columns stored in column-major format to find rows that satisfy said one or more conditions of said each predicate clause.

9. The method of claim 8, wherein at least one column of said columns is compressed.

10. The method of claim 9, wherein for a given set of rows of said table, said columnar scanning includes evaluating whether compressed column values in said at least one column satisfy a predicate condition without decompressing said column values.

11. One or more non-transitory storage media storing instructions for querying a database having a table containing point spatial data, said instructions, which, when executed by one or more computing devices, cause:
   receiving a user request specifying a query window for point spatial data contained within the query window;
   generating one or more tiles that cover the query window;
   computing extents of the one or more tiles;
   generating a query for determining point spatial data in the table contained within the one or more tiles using the extents of the one or more tiles, said query comprising predicate clauses within a WHERE clause, said predicate clauses comprising, for each extent of said extents, a respective predicate clause specifying one or more conditions based on said each extent; and
   computing the query, wherein computing the query includes, for each predicate clause of said predicate clauses:
      sending a respective set of smart scan requests to an enhanced storage device for execution to cause said enhanced storage device to scan for rows that satisfy the one or more conditions of said each predicate clause, and
      from the enhanced storage device, receiving resultant rows returned for the respective set of smart scans.

12. The one or more non-transitory storage media of claim 11, wherein the table is stored in hybrid-columnar format.

13. The one or more non-transitory storage media of claim 12, wherein said table is not indexed by a DBMS.

14. The one or more non-transitory storage media of claim 12, wherein said one or more conditions of each predicate clause of said predicate clauses are based on columns of said table, wherein said columns of said table are not indexed by a DBMS.

15. The one or more non-transitory storage media of claim 11, wherein generating the one or more tiles includes tiling the query window.

16. The one or more non-transitory storage media of claim 11, wherein generating the query includes using the extents of the one or more tiles to generate SQL "BETWEEN" clauses for the query.

17. The one or more non-transitory storage media of claim 11, the instructions further including instructions that, when executed by said one or more computing devices, cause, after computing the query, loading point spatial data into said table without updating an index on said table.

18. The one or more non-transitory storage media of claim 11, wherein in response to said sending a respective set of smart scan requests to an enhanced storage device, said enhanced storage device performs columnar scanning on columns stored in column-major format to find rows that satisfy said one or more conditions of said each predicate clause.

19. The one or more non-transitory storage media of claim 18, wherein at least one column of said columns is compressed.

20. The one or more non-transitory storage media of claim 19, wherein for a given set of rows of said table, said columnar scanning includes evaluating whether compressed column in said at least one column value satisfy a predicate condition without decompressing said column values.

* * * * *

UNITED STATES PATENT AND TRADEMARK OFFICE
CERTIFICATE OF CORRECTION

| | | |
|---|---|---|
| PATENT NO. | : 9,495,466 B2 | Page 1 of 1 |
| APPLICATION NO. | : 14/092503 | |
| DATED | : November 15, 2016 | |
| INVENTOR(S) | : Geringer et al. | |

It is certified that error appears in the above-identified patent and that said Letters Patent is hereby corrected as shown below:

On the Title Page

On page 2, Column 2, item (56), under Other Publications, Line 28, delete ""Fundatmentals" and insert -- "Fundamentals --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*